(12) United States Patent
Vora

(10) Patent No.: US 10,915,936 B1
(45) Date of Patent: Feb. 9, 2021

(54) INTERACTIVE SHOPPING SYSTEM AND METHOD

(71) Applicant: SWIFTGO INC., Houston, TX (US)

(72) Inventor: Jigesh V. Vora, Houston, TX (US)

(73) Assignee: SWIFTGO INC., Houston, TX (US)

( * ) Notice: Subject to any disclaimer, the term of this patent is extended or adjusted under 35 U.S.C. 154(b) by 451 days.

(21) Appl. No.: 14/952,718

(22) Filed: Nov. 25, 2015

Related U.S. Application Data

(63) Continuation-in-part of application No. 14/714,076, filed on May 15, 2015, now Pat. No. 9,230,249.

(60) Provisional application No. 62/139,404, filed on Mar. 27, 2015.

(51) Int. Cl.
- *G06G 1/12* (2006.01)
- *G06Q 20/00* (2012.01)
- *G06Q 30/06* (2012.01)
- *G06Q 20/20* (2012.01)

(52) U.S. Cl.
CPC ....... *G06Q 30/0601* (2013.01); *G06Q 20/202* (2013.01); *G06Q 20/208* (2013.01)

(58) Field of Classification Search
None
See application file for complete search history.

(56) References Cited

U.S. PATENT DOCUMENTS

| | | | |
|---|---|---|---|
| 6,484,939 B1 | 11/2002 | Blaeuer | |
| 8,418,919 B1* | 4/2013 | Beyda | G07G 1/0054 235/375 |
| 2003/0015585 A1 | 1/2003 | Wike et al. | |
| 2012/0284132 A1* | 11/2012 | Kim | G06Q 20/18 705/20 |
| 2013/0132279 A1* | 5/2013 | Nordstrom | G08C 19/00 705/44 |
| 2014/0001258 A1 | 1/2014 | Chan et al. | |
| 2014/0279119 A1* | 9/2014 | Knoll | G07G 1/0018 705/23 |
| 2015/0039462 A1 | 2/2015 | Shastry et al. | |
| 2016/0063609 A1* | 3/2016 | Argue | G06Q 30/0639 705/16 |
| 2016/0223339 A1* | 8/2016 | Pellow | G01C 21/206 |
| 2016/0300455 A1* | 10/2016 | Hutchings | G07G 1/009 |

\* cited by examiner

*Primary Examiner* — Ariel J Yu
(74) *Attorney, Agent, or Firm* — Rao DeBoer Osterrieder, PLLC; Dileep P. Rao

(57) ABSTRACT

An interactive shopping system for use in a retail store. The system can include a container for holding products selected by at least one user, a client device, a scanner, a scale, and a processor in communication with the client device, a positioning system in communication with the client device or the processor, and a visual or audible indicator. The at least one user can select products, view product information, initiate a payment transaction, and complete a purchase utilizing the interactive shopping system.

17 Claims, 6 Drawing Sheets

FIGURE 3

| | |
|---|---|
| STORE LIBRARY | 32 |
| PRODUCT NAMES | 40 |
| PRODUCT WEIGHTS | 41 |
| PRODUCT SPECIFICATIONS | 42 |
| PRODUCT PRICES | 43 |
| PRODUCT DISCOUNTS | 44 |
| STORE COUPONS | 45 |
| MANUFACTURER RECALLS | 46 |
| MANUFACTURER COUPONS | 47 |
| MANAGER SPECIALS | 48 |
| DIGITAL ADVERTISEMENTS | 49 |
| INTERACTIVE MAP | 50 |

FIGURE 4A

| | |
|---|---|
| SELECTING A SHOPPING CART OR BASKET HAVING AT LEAST ONE PROCESSOR, DATA STORAGE, SCANNER, SCALE, AND GLOBAL POSITIONING SYSTEM TRANSMITTER, WHICH CAN ALL BE CONNECTED TO A POWER SUPPLY | 100 |
| SYNCHRONIZING AT LEAST ONE USER CLIENT DEVICE TO THE PROCESSOR | 102 |
| UPLOADING A SHOPPING LIST FROM THE USER CLIENT DEVICE TO THE PROCESSOR | 104 |
| USING THE PROCESSOR TO MATCH PRODUCTS FROM THE AT LEAST ONE USER'S SHOPPING LIST TO PRODUCT LOCATIONS ON THE INTERACTIVE MAP AND THEN DISPLAY THE INTERACTIVE MAP AS A CUSTOMIZED MAP, IDENTIFYING THE LOCATION OF THE PRODUCTS FROM THE USER'S SHOPPING LIST ON THE DISPLAY | 106 |
| USING THE PROCESSOR TO STORE THE CUSTOMIZED INTERACTIVE MAP IN THE DATA STORAGE | 108 |
| USING THE PROCESSOR TO COLOR CODE PRODUCTS ON THE USER'S SHOPPING LIST AS A FIRST COLOR OR COLOR CODE PRODUCTS AS A SECOND COLOR TO DENOTE PRODUCTS THAT ARE DEEMED "SPECIALS" BY THE RETAILER | 110 |
| SCANNING PRODUCTS WITH THE SCANNER AS EACH PRODUCT IS SCANNED BY THE SCANNER, WEIGHED BY THE SCALE, AND COMBINATIONS THEREOF AS THE PRODUCTS ARE PLACED INTO THE SHOPPING CART OR BASKET | 112 |
| USING THE PROCESSOR TO MATCH THE SCANNED AND/OR WEIGHED PRODUCT THAT HAS BEEN PLACED INTO THE SHOPPING CART OR BASKET TO THE STORE LIBRARY CONTAINING PRODUCT CODES AND WEIGHTS FOR THE PRODUCTS IN THE RETAIL STORE AND OBTAINS A PRICE LINKED TO THE WEIGHT OF THE SCANNED PRODUCT | 114 |
| USING THE PROCESSOR TO PROVIDE AN ALARM WHEN THE WEIGHT OF THE SCANNED PRODUCT PLACED INTO THE SHOPPING CART OR BASKET DOES NOT MATCH THE INFORMATION IIN THE STORE LIBRARY | 115 |
| USING THE PROCESSOR TO PRESENT A RUNNING TOTAL OF THE SCANNED AND WEIGHED PRODUCTS TO THE USER | 116 |
| USING THE PROCESSOR TO PRESENT A METER SHOWING HOW MANY PRODUCTS ARE LEFT TO SELECT FROM THE USER'S SHOPPING LIST | 118 |
| USING THE PROCESSOR TO RECEIVE ADVERTISEMENTS AND SPECIALS FROM THE ADMINISTRATIVE PROCESSOR AND PRESENT THE ADVERTISEMENTS AND SPECIALS AT TIMED INTERVALS ON THE DISPLAY OR THE DISPLAY OF THE USER CLIENT DEVICE THROUGHOUT THE SHOPPING EXPERIENCE | 120 |
| SCANNING COUPONS USING THE SCANNER OR UPLOADING COUPONS SAVED ON THE USER CLIENT DEVICE TO THE PROCESSOR | 122 |
| USING THE PROCESSOR TO AUTOMATICALLY APPLY COUPONS APPLICABLE TO PRODUCTS THAT WERE SELECTED, SCANNED AND PLACED IN THE SHOPPING CART OR BASKET AND PRESENTING THE DISCOUNTED SUBTOTALS TO THE USER | 124 |
| USING THE PROCESSOR TO AUTOMATICALLY INDICATE THAT THE SELECTED PRODUCTS ARE "CHECKED OFF" THE USER'S SHOPPING LIST | 126 |

(4B)

(4A)

| | |
|---|---|
| USING THE PROCESSOR AND GLOBAL POSITIONING SYSTEM TRANSMITTER TO SUGGEST EFFICIENT ROUTES THROUGH THE STORE IN ORDER TO ACQUIRE ALL THE PRODUCTS ON THE USER'S SHOPPING LIST | 128 |
| USING THE PROCESSOR TO PRESENT INFORMATION ABOUT "SIMILAR" OR "COMPLEMENTARY" PRODUCT SUGGESTIONS TO THE USER FOR PRODUCTS SCANNED AND PLACED INTO THE SHOPPING CART OR BASKET | 130 |
| USING THE PROCESSOR TO ACTIVATE AN ALARM WHEN THE USER IS PROXIMATE A PRODUCT IDENTIFIED ON THE USER'S SHOPPING LIST | 132 |
| USING A PHONE APPLICATION BASED PAYMENT SYSTEM INSTALLED ON THE USER CLIENT DEVICE TO PROVIDE PAYMENT FOR THE PRODUCTS IN THE SHOPPING CART OR BASKET | 134 |
| USING THE PROCESSOR TO INDICATE THE STATUS OF PAYMENT FOR ITEMS IN THE SHOPPING CART OR BASKET AT DEFINED CHECKPOINTS IN THE RETAIL STORE WITH A SERIES OF COLORED LIGHTS ON A LIGHT ARRAY | 136 |

FIGURE 4B

INTERACTIVE SHOPPING SYSTEM AND METHOD

CROSS REFERENCE TO RELATED APPLICATIONS

The present application Continuation in Part of co-pending application Ser. No. 14/714,076 filed May 15, 2015, entitled "INTERACTIVE SHOPPING SYSTEM AND METHOD", which claims priority to and the benefit of U.S. Provisional Patent Application Ser. No. 62/139,404 filed on Mar. 27, 2015, entitled "INTERACTIVE SHOPPING SYSTEM AND METHOD". These references are hereby incorporated in their entirety.

FIELD

The current embodiments generally relate to a system and method for interactive shopping.

BACKGROUND

A need exists to provide critical user data/information that will allow brick and mortar retail stores to compete with the online stores by providing analytics and user data that currently cannot be tracked and is unavailable for users that walk into retail stores.

A further need exists for an overall improved customer experience at retail stores.

A further need exists for more efficient security in retail stores.

The present embodiments meet these needs.

BRIEF DESCRIPTION OF THE DRAWINGS

The detailed description will be better understood in conjunction with the accompanying drawings as follows:

FIG. 3 depicts the store library according to one or more embodiments.

FIGS. 4A-4B depict the steps of the method for using the interactive shopping system according to one or more embodiments.

Figure 1:
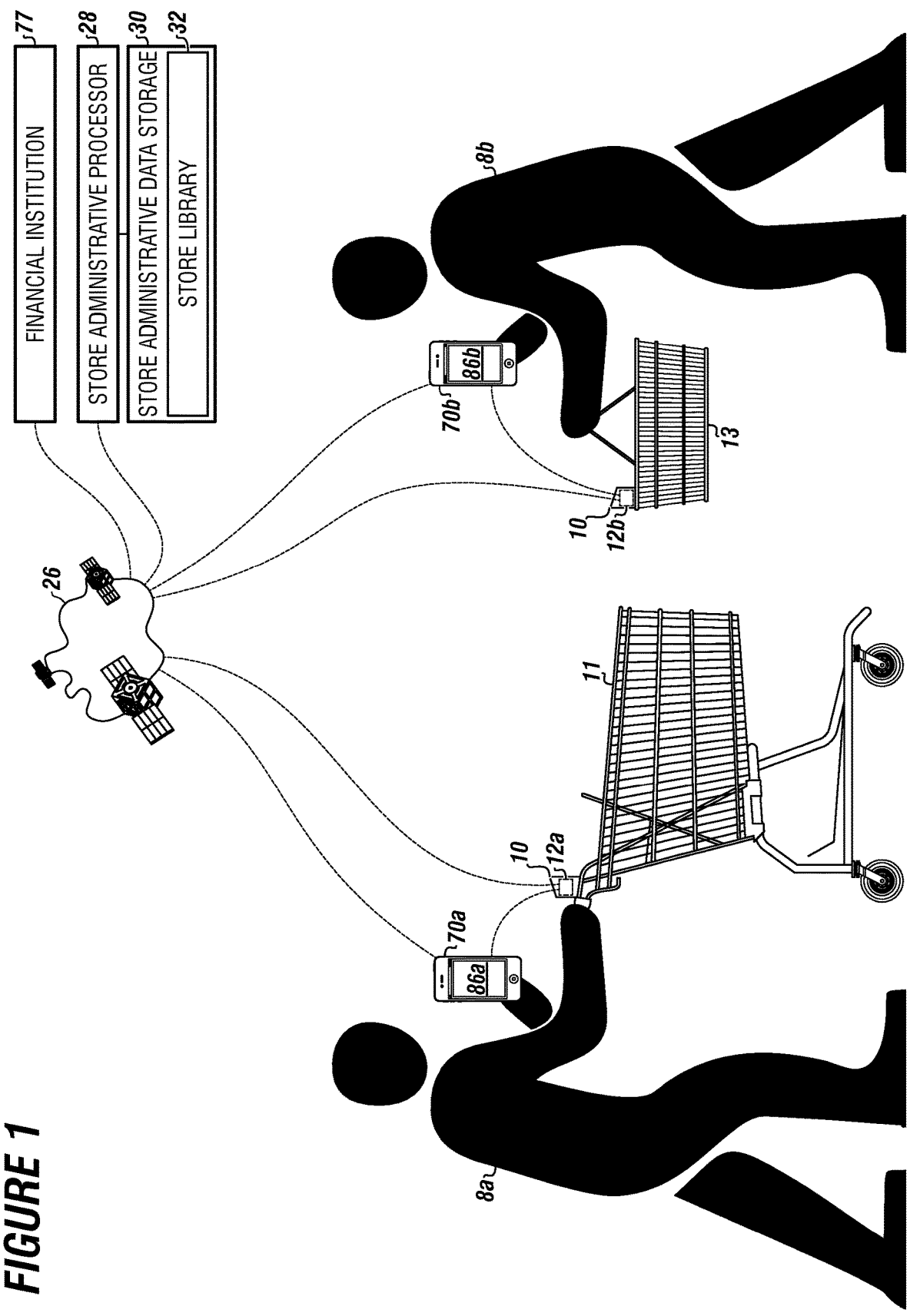
FIG. 1 depicts the interactive shopping system according to one or more embodiments.

The present embodiments are detailed below with reference to the listed Figures.

DETAILED DESCRIPTION OF THE EMBODIMENTS

Before explaining the present system and method in detail, it is to be understood that the system and method are not limited to the particular embodiments and that it can be practiced or carried out in various ways.

The current embodiments generally relate to a system and method for interactive shopping.

Currently, standing in checkout lines at retail stores is time consuming, frustrating, and can negatively affect the customer experience at retail stores.

A benefit of this invention is that the interactive shopping system can save time and provide a more efficient and positive shopping experience.

In embodiments the interactive shopping system for use in a retail store comprises a container for holding products selected by at least one user, a client device, a scanner in communication with the client device, a scale in communication with the client device, a processor in communication with the client device, a positioning system in communication with the client device or the processor, and a visual or audible indicator.

The container can be a shopping cart, a shopping basket, a shopping bag, or any other item used by persons shopping in a store.

The client device can also have a client data transmitter and a client data receiver. In embodiments, the data transmitter and the data receiver can be a single device. The transmitter may communicate through a physical connection, or wirelessly such as by the use of radio waves, infrared communication, line of sight transmission, and the like.

The client device can be provided by the retail store or can be the at least one user's personal device, such as cellular phone, a smart phone, a tablet computer, a smart watch, a laptop, a computer, a personal digital assistant, or combinations thereof.

In embodiments, the client device comprises a display or is in electronic communication with a display.

The scanner can be in communication with the client device to scan products that the user intends to purchase. The scanner can be capable of reading a universal product code, a shape, a quick response code, a bar code, a picture, or combinations thereof. The scanner can identify products that the user has selected for purchase.

The scale can be a scale incorporated or attached to the container, a scale on the floor of the store, a scale for weighing produce, or any means of ascertaining a weight of the container and the products within.

The processor can be any electronic circuitry such as a processor or a microprocessor capable of carrying out the instructions of a computer program. The data storage can be any computer readable medium capable of storing data in a non-transitory fashion. The data storage excludes any transitory signals but can include any non-transitory data storage circuitry, such as buffers, cache, and queues, within transceivers of transitory signals.

The processor can be in communication with a data storage configured to bi-directionally communicate with a network, and further in communication with a store administrative processor and a store administrative data storage having a store library comprising product information.

The data storage or the store administrative data storage can have computer instructions instructing the processor or the store administrative processor to match scanned products with the product information, retrieve the product information as requested by the at least one user, and communicate with the client device to display the product information or initiate a payment transaction.

Product information can include product specifications, product pricing, and other pertinent information as required by a store or the user.

A positioning system can be in communication with the client device or the processor. The positioning system can determine the position of the client device within a store.

In embodiments, a map of the store can be displayed to the user with the position of the client device displayed upon the map of the store. The user can search for products, and a map of the store can be displayed to the user with a position of a product. In embodiments, a route to the product can be displayed to the user.

The system can comprise a visual or audible indicator for determining when a product has been selected for purchase by the user.

In embodiments, the removable sleeve can house a display or LCD screen, which can display product names, product discounts, store coupons, manufacturer recalls, manufacturer coupons, manager specials, digital advertisements, an interactive map, and combinations thereof.

In embodiments, the digital advertisements can be displayed on the side of the shopping cart or on the side of the basket.

The interactive shopping system can include a point of sale system, which can be installed on or in the shopping cart. The point of sale system can be in communication with a corresponding mobile application, which can provide payment for the products in the shopping cart or basket, eliminating the need to have to wait in checkout lines.

The interactive shopping system can use a removable sleeve, which can be easily and quickly connected or disconnected to the shopping cart or the basket. In embodiments, the removable sleeve can be a sheet, such as a plastic cover.

The interactive shopping system can use the processor, which can be in communication with a store administrative processor of a retail store and a store administrative data storage.

The interactive shopping system can use a store library, which can be located in the store administrative data storage. The store library can contain product prices associated with product weights for products being sold in the store as well as product specifications.

The processor can be configured to match scanned products with product prices and product weights from the store library as products are placed in the shopping cart or basket creating a list of purchases; retrieve product specifications as requested by at least one user; calculate a subtotal for scanned products and display the subtotal in real time on a display as products are placed in the shopping cart or basket; and communicate with a phone application based payment system in at least one user client device connected to the network to initiate payment transfers electronically from a financial institution in communication with the network to pay the retail store for products in the shopping cart or basket.

In embodiments, the processor can be configured to download coupons from the at least one user client device for use in paying for products in the shopping cart or basket.

The data storage can have an interactive map with the location of products in the store, linked to the map, which can be displayed on the display.

In embodiments, the processor can use a global positioning system transmitter and the interactive map to provide suggested routes to products on the at least one user's shopping list.

In embodiments, digital advertisements for the at least one user's defined list of product, the retail store selected list of products or combinations thereof can be displayed on the display.

In embodiments, the processor can be configured to match store coupons, manufacturer coupons, and manager specials from the store library as products are scanned by the scanner, and apply the financial discount immediately to the subtotal.

Turning now to the Figures, FIG. 1 depicts the interactive shopping system according to one or more embodiments.

At least one user 8a and 8b with at least one user client device 70a and 70b can have a phone application based payment system 86a and 86b on the at least one user client device 70a and 70b. In embodiments, the client device can be a cellular phone.

The at least one user 8a is shown pushing a shopping cart 11 with processor 12a located on a removable sleeve 10.

The processor 12a can be in communication with a network 26.

In embodiments, the container 11 can be a shopping cart which is approximately 33 inches in length by 21 inches in width by 38 inches in height, with about a 120 pound capacity, and having an available volume of about 4.5 cubic feet.

The shopping cart can be made from metal, plastic, or any other suitable material.

The removable sleeve 10 can have suitable dimensions to fit onto the cart, like a "coat for the shopping cart."

In embodiments, the container 11 can have a height of 38 inches so the removable sleeve 10 would have a height of 38.5 inches. The length of the removable sleeve 10 would be similar to the length of the shopping cart 11. Therefore, if the container 11 was 33 inches in length, the removable sleeve 10 length can be about 33.3 inches. If the width of the container 11 was 21 inches, the removable sleeve 10 can have a width of about 21.3 inches.

The removable sleeve 10 can be made from polycarbonate or a similar, a washable non-porous material that can be flexible yet rigid enough to support the processor, a scanner, a scale, and a display screen on the shopping cart. In embodiments, the sleeve can be covered in printed messages.

The at least one user 8b is shown carrying a basket 13. The basket can have a processor 12b located on a removable sleeve 10. The processor 12b of the basket 13 can also be in communication with the network 26.

In embodiments, the basket 13 can have a dimension of 17 inches in length by 12.5 inches in width by 8 inches in height.

The basket 13 can be made from metal, plastic, or any other suitable material.

In embodiments, the removable sleeve 10 for the basket 13 can have dimensions to fit onto the basket 13 such as 17.3 inches in length by 13 inches in width by 8.5 inches in height for a basket with dimensions of 17 inches in length by 12.5 inches in width by 8 inches in height.

A store administrative processor 28 can be in communication with the network 26 and a store administrative data storage 30. In embodiments, the store administrative data storage 30 can contain as a non-transitory computer readable medium, a plurality of various computer instructions to instruct the store administrative processor 28 to perform various tasks. In further embodiments, the store administrative data storage 30 can contain a store library 32.

The store library 32 can include product information, such as type, brand, sizes/quantity, and price, about various products available for purchase at the store. For example, organic bananas, organic carrots, lactose free milk.

The products for purchase can be grouped by type of product such as, but not limited to: types of fruit, types of clothing, types of electronics, type of foot items, and type of dairy products.

A financial institution 77 can be in communication with the network 26, which can enable the at least one user 8a and 8b to pay from the at least one user client device 70a and 70b.

In embodiments, the financial institution 77 can be any bank, credit union, credit card services, or any online payment systems that the at least one user selects to make a payment.

Figure 2:
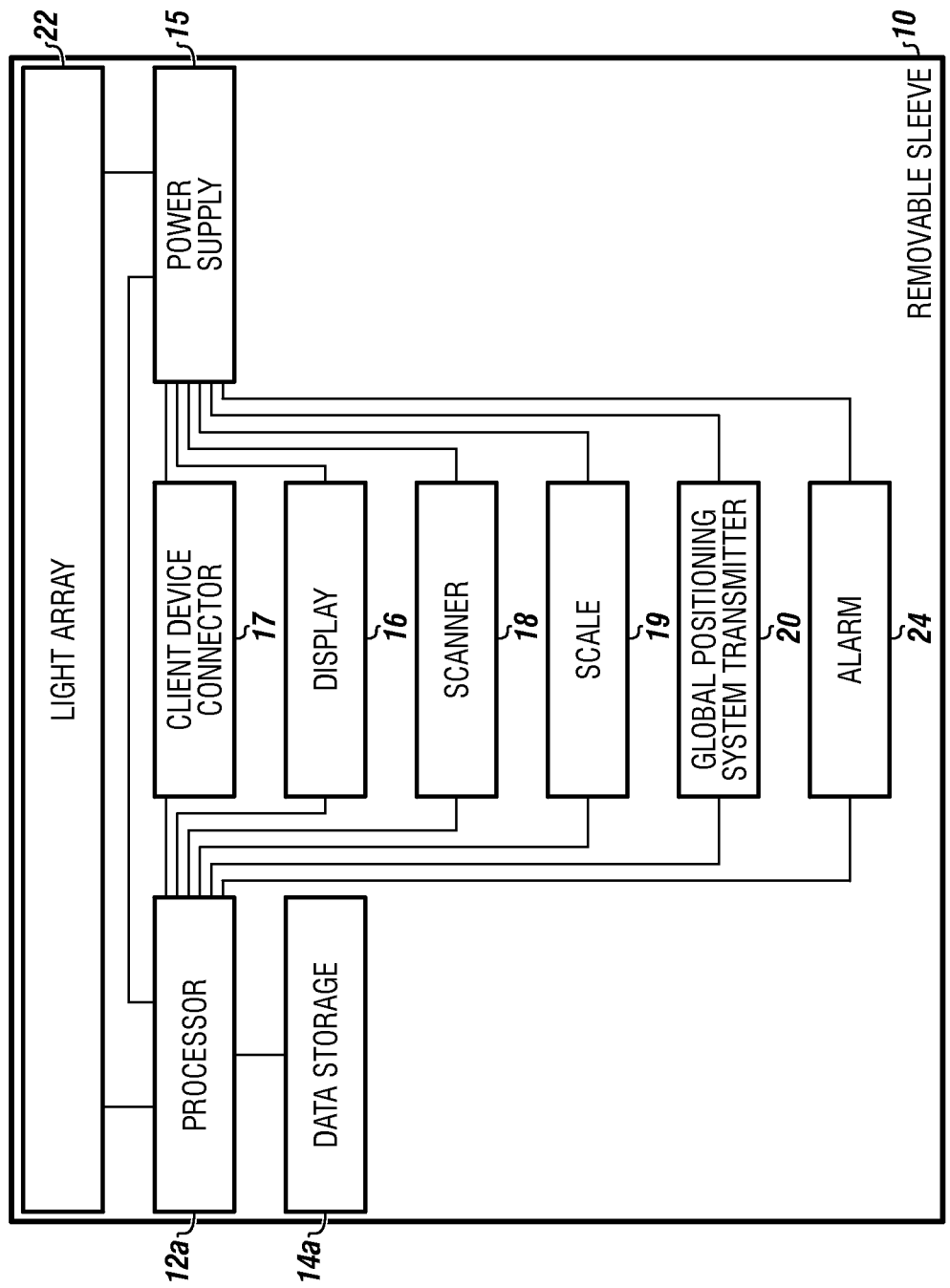
FIG. 2 depicts a removable sleeve which can attach to a container or the basket according to one or more embodiments.

FIG. 2 depicts a removable sleeve which can attach to a container or the basket according to one or more embodiments.

The removable sleeve 10 can be a removable and detachable support, which can be applied over the shopping cart or the basket.

The removable sleeve 10 can house the processor 12a connected to a data storage 14a and a power supply 15, wherein the power supply 15 can provide power to the processor 12a.

In embodiments, the power supply 15 can be 12 volt rechargeable batteries or lithium-ion batteries.

The removable sleeve 10 can have a client device connector 17 in communication with the processor 12a, the at least one user client device, or combinations thereof.

In embodiments, the client device connector 17 can be in communication with the processor 12a for synching the processor 12a with the at least one user client device to download the at least one user's list of products for purchase to the processor 12a, which can then be shown on a display 16.

In embodiments, at least one user's list of products can be called a shopping list.

In embodiments, product information and transaction costs can be displayed to the shopper on the display 16, which can be mounted to the removable sleeve 10.

The display 16 can show details about the at least one user, the store, and scanned items as well as coupons and other marketing the store can choose to display on it. In embodiments, the display can be a LCD screen mounted on the shopping cart or basket or a client device such as a cellular phone screen.

For example, if Mary is shopping at TARGET® and she scans the shopping cart's QR code on her phone, the shopping cart can read "Mary, Welcome to TARGET® Store #123" and the display 16 can show items that TARGET® has decided to market specifically to Mary based on the analysis of her shopping history. For example, "Today's Deal: Buy 1 Get 1 free on LEVI'S Women Denims." Then, if Mary chooses to read more about any of those deals, she can click on the deal and the display 16 can show the details about the item including its location. In further embodiments, a 'Get me there' icon can be used to display a map to locate the item in the store.

The removable sleeve 10 can have a scanner 18, a scale 19, a global positioning system transmitter 20, a light array 22 and an alarm 24.

In embodiments, the scanner 18, the scale 19, the global positioning system transmitter 20, the light array 22 and the alarm 24 can be connected to or in communication with the processor 12a and the power supply 15.

The global positioning transmitter 20 on the shopping cart can allow the retailer to know where the shopping cart is located at all times and also provides a way to show deals on the display 16 based on the shopping cart's location within the store. The global positioning system transmitter 20 can also allow the store map function to guide the at least one user to a certain part of the store.

In embodiments, the light array 22 can be configured to provide a first visual indicator such as an array of green lights, a group of white lights that form the word "paid", or provide an array of steady white lights when all the products in the shopping cart or basket are paid.

In embodiments, the light array 22 can be configured to provide a second visual indicator when at least one product is unpaid or when a weight does not match scanned information. The second visual indicator can be a complete set of red lights; can form a rolling message, or an animated message.

In embodiments, the light array 22 can consist of about 400 LEDs disposed around the circumference of the removable sleeve 10 forming the light array 22. The light array 22 can be configured to have an the ability to create various combinations with the LEDs including blinking all red lights simultaneously in case the items in the shopping cart or basket are not paid for. In additional embodiments, all green LEDs can mean all items on the shopping cart or basket are paid for. In additional embodiments, every alternate LED can blink red and white during Christmas Day or any other light combinations for other holidays.

In embodiments, the light array 22 can be configured to provide a third visual indicator when at least one scanned product is pending payment. The third visual indicator can be a group of yellow lights.

In embodiments, the alarm 24 can be visual or audible. In embodiments, the alarm 24 can change the color of the light array 22 based on commands from the processor 12a and data storage 14a.

In embodiments, the alarm 24 can be configured to activate when a shopper or the at least one user is proximate to a product identified on the at least one user defined list. In embodiments, the alarm 24 can be configured to activate when a shopper or the at least one user with an unpaid item tries to leave the retail store.

FIG. 3 depicts the store library 32 according to one or more embodiments.

In embodiments, the store library 32 can contain, but is not limited to: product names 40, product weights 41, product specifications 42, product prices 43, product discounts 44, store coupons 45, manufacturer recalls 46, manufacturer coupons 47, manager specials 48, digital advertisements 49 for products of the retail store, and an interactive map 50 which can show products location in the retail store. In additional embodiments, the store library 32 can be customized to contain information on products of a downloaded user's list or for a retail store selected list of products.

In embodiments, the processor can display at least one of product discounts 44 or digital advertisements 49 simultaneously as a plurality of clickable thumbnail images on the display as the shopping occurs in the retail store.

In embodiments, the store library 32 can include product names 40, such as TIDE®; product discounts 44, such as $0.10 off through Sunday; store coupons 45, such as buy one get one free; manufacturer recalls 46, such as cereal with product codes ending in P22; manufacturer coupons 47, such as 40 cents off any BORDON® product; manager specials 48, such as hamburger today only 50 cents a pound; digital advertisements 49, such as a flashing message to buy toilet tissue now; and the interactive map 50 showing product locations in the store.

FIGS. 4A-4B depict the steps of the method for using an interactive shopping system according to one or more embodiments.

The method can include selecting a shopping cart or basket having an the processor, data storage, scanner, scale, and global positioning system transmitter, which can all be connected to an power supply, as shown in step 100.

In embodiments, the processor can be in communication with the local network of the retail store. In embodiments, the local network can be in communication with the administrative processor connected to the administrative data storage.

The method can include synchronizing at least one user client device to the processor, as shown in step 102.

If at least one user has a shopping list located on the at least one user client device, the method can include uploading a shopping list from the user client device to the processor, as shown in step 104.

The data storage can have an interactive map with the location of products in the store, linked to the map.

If the user chooses to upload their shopping list from the user client device to processor, the method can include using the processor to match products from the at least one user's shopping list to product locations on the interactive map and then display the interactive map as a customized map, identifying the location of the products from the user's shopping list on the display, as shown in step 106.

The method can include using the processor to store the customized interactive map in the data storage, as shown in step 108.

In embodiments, the customized interactive map can be transmitted to the user client device and displayed on the synchronized user client device.

The method can include using the processor to color code products on the user's shopping list as a first color or color code products as a second color to denote products that are deemed "specials" by the retailer, as shown in step 110.

In embodiments, the processor can color code various items, which are not limited. For example, a first color can be used for a product on a user's shopping list, a second color can be used for products a user usually purchases, a third color can be used to denote products on "special" by the retailer, a fourth color can be used for a product that has a store coupon, and so forth.

The method can include scanning products with the scanner as each product is scanned by the scanner, weighed by the scale, and combinations thereof as the products are placed into the shopping cart or basket, as shown in step 112.

The method can include using the processor to match the scanned and/or weighed product that has been placed into the shopping cart or basket to the store library containing product codes and weights for the products in the retail store and obtains a price linked to the weight of the scanned product, as shown in step 114.

The method can include using the processor to provide an alarm when the weight of the scanned product placed into the shopping cart or basket does not match the information in the store library, as shown in step 115.

The method can include using the processor to present a running total of the scanned and weighed products to the user, as shown in step 116.

If the user chooses to upload their shopping list from the user client device to the processor, the method can include using the processor to present a meter showing how many products are left to select from the user's shopping list, as shown in step 118.

The method can include using the processor to receive advertisements and specials from the administrative processor and present the advertisements and specials at timed intervals on the display or the display of the user client device throughout the shopping experience, as shown in step 120.

The method can include scanning coupons using the scanner or uploading coupons saved on the user client device to the processor, as shown in step 122.

The method can include using the processor to automatically apply coupons applicable to products that were selected, scanned and placed in the shopping cart or basket and presenting the discounted subtotals to the user, as shown in step 124.

If the user chooses to upload their shopping list from the user client device to the processor, the method can include using the processor to automatically indicate that the selected products are "checked off" the user's shopping list, as shown in step 126.

If the user chooses to upload their shopping list from the user client device to the processor, the method can include using the processor and global positioning system transmitter to suggest efficient routes through the store in order to acquire all the products on the user's shopping list, as shown in step 128.

The method can include using the processor to present information about "similar" or "complementary" product suggestions to the user for products scanned and placed into the shopping cart or basket, as shown in step 130.

In embodiments, the information about "similar" or "complementary" product suggestions presented by the processor, can include brand names, prices, product details, user reviews, the location, which can be indicated on the interactive map, of the suggested "similar" or "complementary" in the store, or combinations thereof.

If the user chooses to upload their shopping list from the user client device to the processor, the method can include using the processor to activate an alarm when the user is proximate a product identified on the user's shopping list, as shown in step 132.

The method can include using a phone application based payment system installed on the user client device to provide payment for the products in the shopping cart or basket, as shown in step 134.

The method can include using the processor to indicate the status of payment for items in the shopping cart or basket at defined checkpoints in the retail store with a series of colors or other visual indicators on a light array, as shown in step 136.

Figure 5:
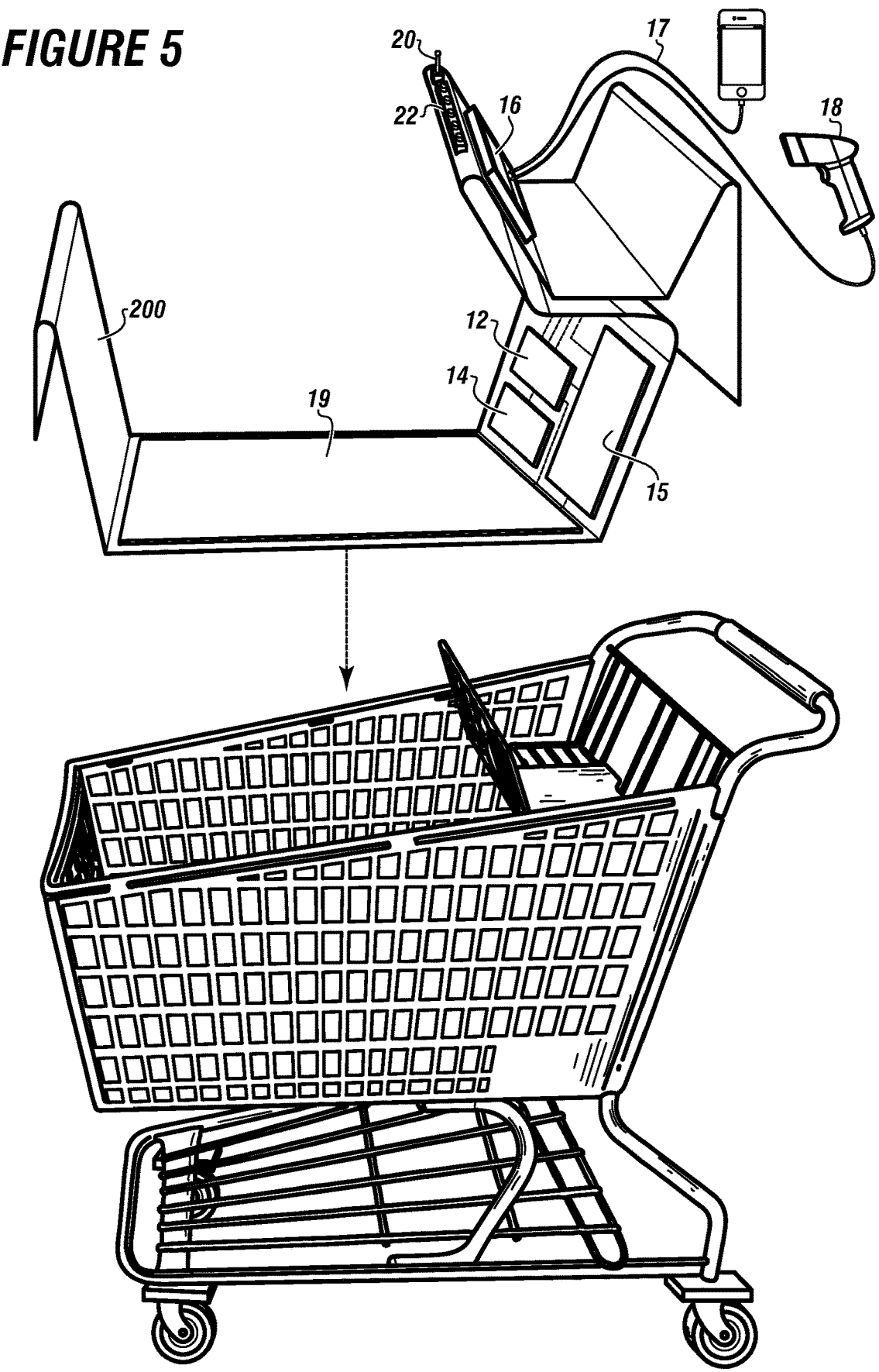
FIG. 5 depicts a perspective view of the interactive shopping system with a container according to one or more embodiments.

FIG. 5 depicts a perspective view of the interactive shopping system with a container according to one or more embodiments.

In this embodiment, the removable sleeve is shown as a sheet 200, which can cover the shopping cart in one or more embodiments.

The shopping cart can have the scanner 18 and the scale 19 connected to the processor 12 and the power supply 15.

The processor 12 can be in communication with the data storage 14, wherein the processor can be configured to bi-directionally communicate with the network.

The display 16 is shown connected to the processor 12 and the power supply 15.

The client device connector 17 is shown in communication with the processor 12 for syncing the processor 12 with the at least one user client device to download the at least one user's list of products for purchase to the processor 12.

A global positioning system transmitter 20 can connect to the processor 12 and the power supply 15.

A light array 22 is shown mounted to the sheet 200, wherein the light array can be connected to the processor 12 and the power supply 15.

While these embodiments have been described with emphasis on the embodiments, it should be understood that within the scope of the appended claims, the embodiments might be practiced other than as specifically described herein.

What is claimed is:

1. An interactive shopping system for use in a retail store comprising:
   - a a container for holding products selected by at least one user;
   - b a client device, wherein the client device is specific to the user, and further wherein the client device is attachable to a removable sleeve integrated with a sensor for scanning or weighing a product attached to the container; and
   - c a processor in communication with the client device, wherein the processor is further in communication with a data storage configured to bi-directionally communicate with a network, and further in communication with a store administrative processor with a store administrative data storage having a store library comprising product information, wherein the processor in communication with the client device acts as a user specific portable point of sale when used in conjunction with the administrative processor, wherein the data storage or the store administrative data storage comprise computer instructions instructing the processor or the store administrative to:
     - i match scanned products with the product information, wherein the product information includes product specifications or product pricing;
     - ii retrieve the product information as requested by the at least one user;
     - iii communicate with the client device to display the product information; or
     - iv initiate a payment transaction from the client device with the portable point of sale.

2. The interactive shopping system of claim 1, wherein the container is a shopping cart, a shopping basket, or a shopping bag.

3. The interactive shopping system of claim 1, wherein the client device is provided by the retail store or is a personal device of the at least one user.

4. The interactive shopping system of claim 3, wherein the client device comprises a display.

5. The interactive shopping system of claim 1, wherein the scanner identifies a product based upon a product code.

6. The interactive shopping system of claim 1, wherein the client device is a cellular phone, a smart phone, a tablet computer, a smart watch, a laptop, a computer, a personal digital assistant, or combinations thereof.

7. The interactive shopping system of claim 1, wherein the scanner is capable of reading a universal product code, a shape, a quick response code, a bar code, a picture, or combinations thereof.

8. The interactive shopping system of claim 1, further comprising a positioning system in communication with the client device or the processor.

9. The interactive shopping system of claim 8, wherein the positioning system ascertains a position of the client device within the retail store.

10. The interactive shopping system of claim 8, wherein a map of the retail store is displayed to the at least one user with the position of the client device displayed upon the map of the retail store.

11. The interactive shopping system of claim 8, wherein a map of the retail store is displayed to the at least one user with a position of a product.

12. The interactive shopping system of claim 1, further comprising a visual or audible indicator.

13. The interactive shopping system of claim 12, wherein a route to the product is displayed to the at least one user.

14. The interactive shopping system of claim 1, wherein the positioning system ascertains a position of the client device within the retail store.

15. The interactive shopping system of claim 1, wherein the processor in communication with the client device and the container constitutes a user specific portable point of sale.

16. The interactive shopping system of claim 1, further comprising at least one visual indicator, wherein each visual indicator of the at least one visual indicator denotes all products are paid, at least one product is unpaid, or at least one product is pending payment.

17. The interactive shopping system of claim 16, wherein each visual indicator of the at least one visual indicator is a colored light.

* * * * *